Dec. 12, 1933.   A. PORCELLI   1,939,519
AUTOMOBILE BRAKE MECHANISM AND SAFETY DEVICE
Filed May 18, 1933
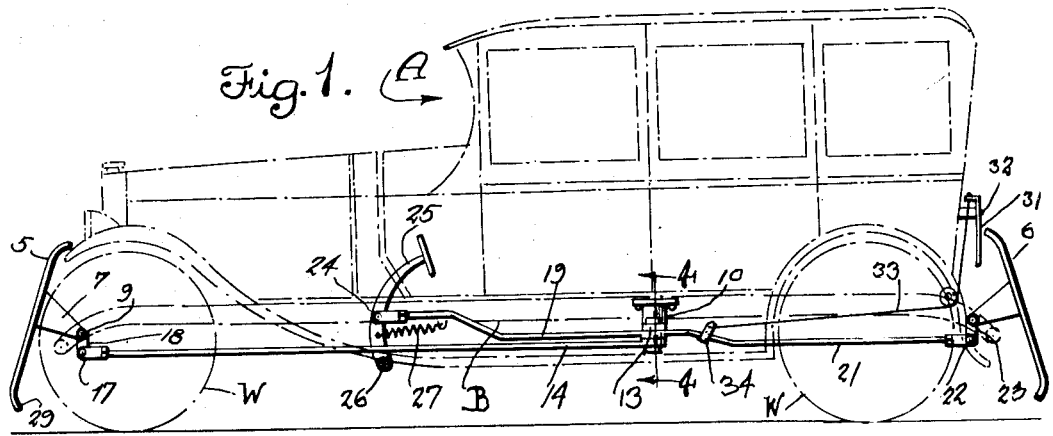
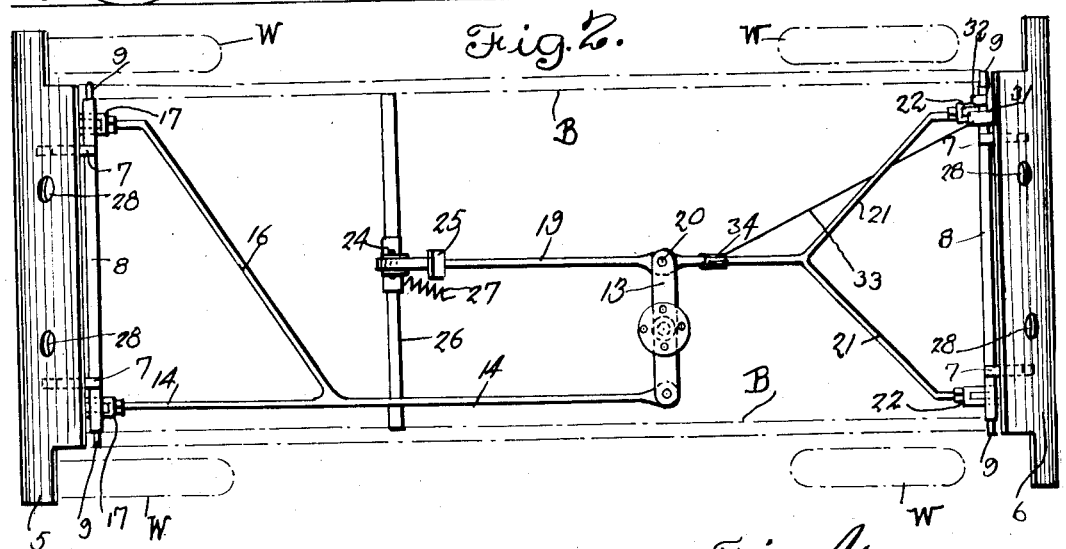
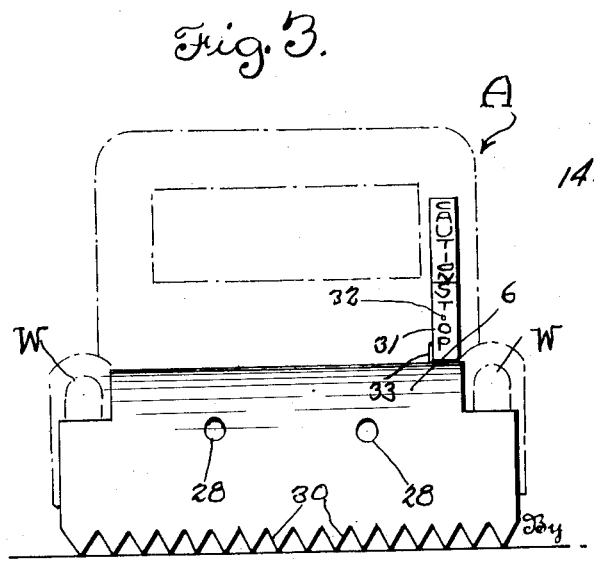
Inventor
Alfonso Porcelli.
Bryant & Lowry
Attorneys Patented Dec. 12, 1933

1,939,519

UNITED STATES PATENT OFFICE 1,939,519

AUTOMOBILE BRAKE MECHANISM AND SAFETY DEVICE

Alfonso Porcelli, Brooklyn, N. Y.

Application May 18, 1933. Serial No. 671,737

6 Claims. (Cl. 188—5)

This invention relates to certain new and useful improvements in automobile brake mechanism and safety device.

The primary object of the invention is to provide a brake mechanism for motor vehicles operable both manually and automatically and is primarily intended as emergency equipment, embodying ground engaging brake shoes or plates extending transversely of the front and rear of the motor vehicle and projecting laterally of the vehicle wheels and operable to prevent skidding movement in any direction when engaged with the ground and also acting to prevent the rolling of wheels over objects encountered.

It is a further object of the invention to associate with the emergency brake mechanism a signal arm showing "Stop" that is rendered operable upon application of the emergency brake mechanism.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 illustrates by dot and dash lines an automobile in side elevation with the emergency brake and life saving mechanism associated therewith;

Figure 2 is a top plan view of the emergency brake mechanism with part of the automobile illustrated by dot and dash lines;

Figure 3 is a rear elevational view of the rear brake shoe or plate in ground engaging position with the automobile illustrated by dot and dash lines; and Figure 4 is a detail sectional view taken on line 4—4 of Figure 1.

The emergency brake mechanism is of a character permitting its use with motor vehicles of standard construction and comprises a pair of ground engaging brake shoes or plates 5 and 6 respectively arranged at the front and rear ends of the automobile A, the brake mechanism having parts thereof supported on the body of the automobile A and the side chassis bars B, each brake shoe or plate 5 and 6 extending transversely of the automobile and being of a width to extend beyond the automobile wheels W, constituting front and rear fenders to prevent the wheels of the automobile from running over a person or other object.

The support for each brake plate 5 and 6 includes a pair of arms 7 perpendicularly projecting therefrom and rigidly connected to a cross bar 8 that is journalled at its opposite ends as at 9 in the side chassis bars B.

The cross bars 8 supporting the brake plates 5 and 6 are adapted to be rotated for shifting the brake plates into and out of ground engaging positions and the operating means for the cross bars 8 include a bearing shaft 10 secured to and depending from the bottom 11 of the automobile A and said shaft 10 rotatably supports at its lower end as at 12, a lever 13 that is pivoted thereto. The opposite ends of the lever 13 are respectively connected to the front and rear cross-bars 8, the connection between the lever 13 and front cross bar 8 including a longitudinally extending rod 14 pivoted to one end of the lever 13 as at 15, the rod 14 carrying an angularly extending rod 16, the forward ends of the rods 14 and 16 being pivotally connected as at 17 with depending arms 18 carried by the cross bar 8 and rigid therewith. The connection between the other end of the lever 13 and the rear brake plate 6 includes a brake rod 19 pivoted intermediate its end as at 20 to the lever 13, the rear end of the brake rod 19 being forked as at 21 with the ends of the forks 21 pivotally connected as at 22 to the arms 23 rigid with and depending from the rear cross bar 8. A brake rod 19 extends forwardly of the lever 13 and is pivotally connected as at 24 with the pedal 25 that has a bearing on the cross shaft 26, the pedal 25 being normally tensioned as at 27 in a rearward direction to cause movement of the lever 13 for holding the brake shoes or plates 5 and 6 in their elevated normally inoperative positions. Each brake plate 5 and 6 is provided with spaced openings 28 permitting the passage of tow lines or the like for attachment to parts of the automobile chassis and each brake plate further has its lower edge curved as at 29 as shown in Figure 1 and serrated or toothed as at 30 for biting engagement with the ground.

A stop signal is rendered operable simultaneously with application of the brake shoes or plates 5 and 6, the stop signal arm 31 pivotally supported upon the bracket 32 at the rear end of the automobile A having a pull cord connection 33 with the brake rod 19 at the point 34 so that when the brake rod 19 is shifted to lower the brake plates 5 and 6 into ground engaging position, the signal arm 31 is shifted from its position shown in Figure 1 rearwardly of the brake plate 6 upwardly to an exposed position as shown in Figure 3.

From the above detailed description of the invention, it is believed that the construction and operation thereof will at once be apparent, it being noted that the brake plates 5 and 6 are manually operated by the pedal 25 to have the toothed edges 30 thereof moved into ground engaging position and a structure of this character is especially serviceable upon ice covered pavements and also for safely holding the automobile against movement when parked on an incline. The brake plates 5 and 6 are automatically operated when an obstruction is encountered and as the brake plates extend laterally over the wheels W of the automobile, they act to prevent passage of the wheels over the body of a person or other object.

While there is herein shown and described the preferred embodiment of the invention, it is nevertheless to be understood that minor changes may be made therein without departing from the spirit and scope of the invention as claimed.

I claim:—

1. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars, manually operable means for the lever for shifting the brake plates into ground engaging positions, and the brake plates being of a width to overlie the ground wheels of the automobile.

2. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars, manually operable means for the lever for shifting the brake plates into ground engaging positions, the brake plates being of a width to overlie the ground wheels of the automobile, and a stop signal device at one end of the automobile operatively associated with the emergency brake mechanism.

3. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars and manually operable means for the lever for shifting the brake plates into ground engaging positions, the manually operable means including rod connections respectively between opposite ends of the lever and the cross bars at each end of the automobile and one of said rods acting as a foot operated brake rod.

4. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars, manually operable means for the lever for shifting the brake plates into ground engaging positions, the brake plates being of a width to overlie the ground wheels of the automobile, the manually operable means including rod connections respectively between opposite ends of the lever and the cross bars at each end of the automobile and one of said rods acting as a foot operated brake rod.

5. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars, manually operable means for the lever for shifting the brake plates into ground engaging positions, a stop signal device at one end of the automobile operatively associated with the emergency brake mechanism, the manually operable means including rod connections respectively between opposite ends of the lever and the cross bars at each end of the automobile and one of said rods acting as a foot operated brake rod.

6. Emergency brake mechanism comprising a pair of ground engageable brake plates respectively mounted transversely at the front and rear of an automobile, a cross bar supporting each plate, a lever pivotally mounted intermediate the plates, connections between the ends of the lever and cross bars, manually operable means for the lever for shifting the brake plates into ground engaging positions, the brake plates being of a width to overlie the ground wheels of the automobile, a stop signal device at one end of the automobile operatively associated with the emergency brake mechanism, the manually operable means including rod connections respectively between opposite ends of the lever and the cross bars at each end of the automobile and one of said rods acting as a foot operated brake rod.

ALFONSO PORCELLI.